United States Patent
Chian et al.

(10) Patent No.: US 12,288,381 B2
(45) Date of Patent: Apr. 29, 2025

(54) PROCESSING METHOD OF MEDICAL IMAGE AND COMPUTING APPARATUS FOR PROCESSING MEDICAL IMAGE

(71) Applicant: Wistron Corporation, New Taipei (TW)

(72) Inventors: Guan Yi Chian, New Taipei (TW); Kuan-I Chung, New Taipei (TW)

(73) Assignee: Wistron Corporation, New Taipei (TW)

(*) Notice: Subject to any disclaimer, the term of this patent is extended or adjusted under 35 U.S.C. 154(b) by 360 days.

(21) Appl. No.: 17/897,226

(22) Filed: Aug. 29, 2022

(65) Prior Publication Data
US 2023/0410480 A1   Dec. 21, 2023

(30) Foreign Application Priority Data
Jun. 20, 2022   (TW) .................... 111122823

(51) Int. Cl.
*G06V 10/774*   (2022.01)
*G06T 7/00*   (2017.01)
(Continued)

(52) U.S. Cl.
CPC .......... *G06V 10/774* (2022.01); *G06T 7/0012* (2013.01); *G06V 10/225* (2022.01);
(Continued)

(58) Field of Classification Search
CPC ...... G06V 10/774; G06V 10/96; G06V 10/32; G06V 10/267; G06V 10/776;
(Continued)

(56) References Cited

U.S. PATENT DOCUMENTS

| | | |
|---|---|---|
| 9,886,757 B2 | 2/2018 | Chang et al. |
| 10,614,573 B2 | 4/2020 | Lin et al. |

(Continued)

FOREIGN PATENT DOCUMENTS

| | | |
|---|---|---|
| CN | 105447872 | 3/2016 |
| TW | I577342 | 4/2017 |

(Continued)

OTHER PUBLICATIONS

Sainz De Cea Maria V et al: "Multi-task Learning for Detection and Classification of Cancer in Screening Mammography", Sep. 29, 2020 (Sep. 29, 2020), 16th European Conference—Computer Vision—ECCV 2020, Cornell University Library, pp. 241-250, XP047564144. (Year: 2020).*

(Continued)

*Primary Examiner* — John J Lee
(74) *Attorney, Agent, or Firm* — JCIPRNET (57) ABSTRACT

An embodiment of the invention provides a processing method of a medical image and a computing apparatus for processing a medical image. In the method, one or more image samples are obtained, a tumor region and an appearance feature thereof in the image sample are marked, and an image recognition model is trained according to the image sample, the tumor region thereof, and an appearance feature of a first tumor. The image sample is an image obtained by photographing an animal body. The appearance feature represents an appearance of the first tumor corresponding to the tumor region. The image recognition model identifies a second tumor in an image to be evaluated is a first type. The first type is related to the tumor region and the appearance feature of the first tumor. Accordingly, a prediction accuracy may be improved.

18 Claims, 5 Drawing Sheets

(51) Int. Cl.
    *G06V 10/22* (2022.01)
    *G06V 10/26* (2022.01)
    *G06V 10/32* (2022.01)
    *G06V 10/776* (2022.01)
    *G06V 10/96* (2022.01)

(52) U.S. Cl.
    CPC ............ *G06V 10/267* (2022.01); *G06V 10/32* (2022.01); *G06V 10/776* (2022.01); *G06V 10/96* (2022.01); *G06T 2207/20081* (2013.01); *G06T 2207/20084* (2013.01); *G06T 2207/30096* (2013.01); *G06V 2201/03* (2022.01)

(58) Field of Classification Search
    CPC .......... G06V 10/225; G06V 2201/03; G06T 7/0012; G06T 2207/20081; G06T 2207/20084; G06T 2207/30096
    See application file for complete search history.

(56) References Cited

U.S. PATENT DOCUMENTS

| | | | |
|---|---|---|---|
| 2017/0221199 A1* | 8/2017 | Chang | G06T 7/337 |
| 2018/0276821 A1* | 9/2018 | Lin | A61B 8/5223 |
| 2023/0008386 A1 | 1/2023 | Nahum et al. | |

FOREIGN PATENT DOCUMENTS

| | | |
|---|---|---|
| WO | 2021123651 | 6/2021 |
| WO | 2021126370 | 6/2021 |

OTHER PUBLICATIONS

Sainz De Cea Maria et al: "Multi-task Learning for Detection and Classification of Cancer in Screening Mammography", Medical Image Computing and Computer Assisted Intervention—MICCAI 2020, Sep. 29, 2020, pp. 241-250.

Fei Gao et al: "A Feature Transfer Enabled Multi-Task Deep Learning Model on Medical Imaging", Expert Systems with Applications vol. 143, Apr. 1, 2020, pp. 1-25.

Thi-Lam-Thuy Le et al: "Multitask Classification and Segmentation for Cancer Diagnosis in Mammography", International Conference on Medical Imaging with Deep Learning 2019. MIDL 2019, Sep. 11, 2019, pp. 1-4.

Yan Yutong et al: "Towards improved breast mass detection using dual-view mammogram matching" Medical Image Analysis vol. 71, Jul. 2021, pp. 1-10.

"Search Report of Europe Counterpart Application", issued on Dec. 23, 2022, p. 1-p. 15.

"Office Action of Japan Counterpart Application", issued on Jul. 18, 2023, p. 1-p. 3.

"Office Action of Taiwan Counterpart Application", issued on Mar. 23, 2023, p. 1-p. 9.

"Office Action of Japan Counterpart Application", issued on Oct. 10, 2023, p. 1-p. 4.

* cited by examiner

PROCESSING METHOD OF MEDICAL IMAGE AND COMPUTING APPARATUS FOR PROCESSING MEDICAL IMAGE

CROSS-REFERENCE TO RELATED APPLICATION

This application claims the priority benefit of Taiwan application serial no. 111122823, filed on Jun. 20, 2022. The entirety of the above-mentioned patent application is hereby incorporated by reference herein and made a part of this specification.

BACKGROUND OF THE INVENTION

Field of the Invention

The invention relates to medical image processing, and in particular, to a processing method of a medical image and a computing apparatus for processing a medical image.

Description of Related Art

Cancers caused by tumors may be life-threatening. For example, breast cancer is the number one cancer women in our nation are most susceptible to, with a mortality rate ranking fourth. Early-stage breast cancer accounts for a higher proportion of cases screened. In addition, if early-stage breast cancer is properly treated, the five-year survival rates for stage 0 and stage 1 are as high as 97.5% and 95.6%. The mainstay of breast cancer treatment is breast-conserving surgery, which minimizes the impact on the appearance of the patient's breast.

It should be mentioned that invasive breast carcinoma with extensive intraductal component is difficult to confirm directly by mammography, and may only be interpreted by pathological examination of the tumor after resection. If the tumor is not completely removed at the moment of surgery, the patient is prone to recurrence after surgery and requires additional surgery. According to a study, tumors with intraductal component are twice as likely to undergo reoperation as those without component. Therefore, if the location of extensive intraductal component may be clearly marked and removed before surgery, the probability of postoperative recurrence may be reduced, and the need for further surgery may be avoided.

At present, the screening, detection, and treatment of invasive breast cancer combined with extensive intraductal component mainly follow the following steps:

Step 1: The patient undergoes mammography.
Step 2: The physician reviews the mammography images and conducts preoperative examinations, and formulates a surgical plan.
Step 3: The doctor performs a breast cancer tumor resection.
Step 4: Perform a pathological examination.
Step 5: Calculate the composition of component. If exceeding 25%, it is defined as containing extensive intraductal component.

In the current clinical process, if whether the breast cancer tumor contains extensive intraductal component is to be assessed before surgery, an MM scan is the most accurate assessment method. However, MM scans are not routine preoperative examinations. Therefore, the conventional method still needs to perform pathological examination after the patient's surgery to calculate the component. In addition, if the analysis result contains extensive intraductal component, the patient will require another operation to completely remove the diseased area.

In addition to extensive intraductal component, other types of tumors may also be difficult to identify directly on mammography images.

SUMMARY OF THE INVENTION

Accordingly, an embodiment of the invention provides a processing method of a medical image and a computing apparatus for processing a medical image also based on an appearance training model to improve image recognition of a tumor accordingly.

A processing method of a medical image of an embodiment of the invention includes (but is not limited to) the following steps: obtaining one or more image samples, marking a tumor region and an appearance feature thereof in the image sample, and training an image recognition model according to the image sample, the tumor region thereof, and an appearance feature of a first tumor. The image sample is an image obtained by photographing an animal body. The appearance feature represents an appearance of the first tumor corresponding to the tumor region. The image recognition model identifies a second tumor in an image to be evaluated is a first type. The first type is related to the tumor region and the appearance feature of the first tumor.

A computing apparatus for processing a medical image of an embodiment of the invention includes (but is not limited to) a memory and a processor. The memory stores a code. The processor is coupled to the memory. The processor is configured to load and execute the code to obtain one or more image samples, a tumor region and an appearance feature thereof in the image sample are marked, and an image recognition model is trained according to the image sample, the tumor region thereof, and an appearance feature of a first tumor. The image sample is an image obtained by photographing an animal body. The appearance feature represents an appearance of the first tumor corresponding to the tumor region. The image recognition model identifies a second tumor in an image to be evaluated is a first type. The first type is related to the tumor region and the appearance feature of the first tumor.

Based on the above, according to the processing method of the medical image and the computing apparatus for processing the medical image according to the embodiments of the invention, the image recognition model may be trained according to both the location and the appearance of the tumor. Thereby, the recognition accuracy of the specific tumor type may be improved.

In order to make the aforementioned features and advantages of the disclosure more comprehensible, embodiments accompanied with figures are described in detail below.

DESCRIPTION OF THE EMBODIMENTS

Figure 1:
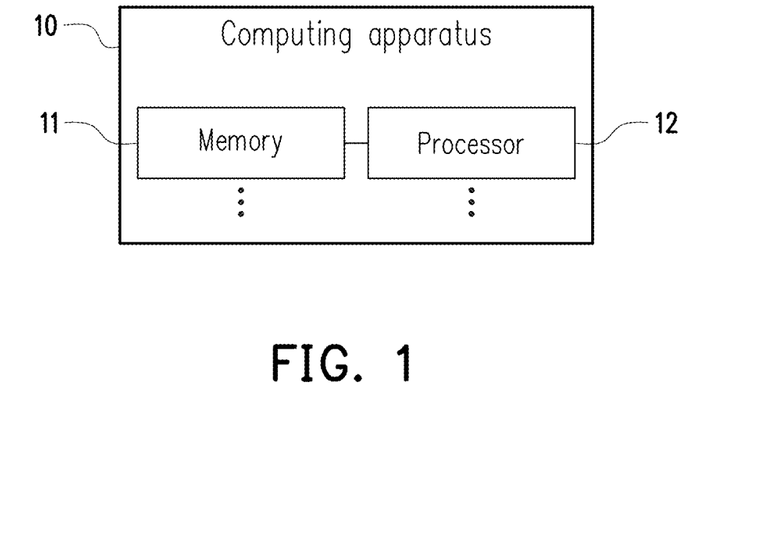
FIG. 1 is a device block diagram of a computing apparatus according to an embodiment of the invention.

FIG. 1 is a device block diagram of a computing apparatus 10 according to an embodiment of the invention. Referring to FIG. 1, the computing apparatus 10 includes (but is not limited to) one or more memories 11 and one or more processors 12. The computing apparatus 10 may be one or more desktop computers, notebook computers, smart phones, tablet computers, servers, or other electronic apparatuses.

The memory 11 may be any form of a fixed or movable random-access memory (RAM), read-only memory (ROM), flash memory, traditional hard disk drive (HDD), solid-state drive (SSD), or similar devices. In an embodiment, the memory 11 stores a code, a software module, a configuration, data, or a file (e.g., a sample, a model parameter, or an image).

The processor 12 is coupled to the memory 11. The processor 12 may be a central processing unit (CPU), a graphics processing unit (GPU), or other programmable general-purpose or special-purpose microprocessors, digital signal processors (DSPs), programmable controllers, field-programmable gate arrays (FPGAs), application-specific integrated circuits (ASICs), neural network accelerators, or other similar devices or a combination of the above devices. In an embodiment, the processor 12 is configured to perform all or part of the operations of the computing apparatus 10, and may load and execute each of the program codes, software modules, files, and data stored in the memory 11. In some embodiments, some operations in a method of an embodiment of the invention may be implemented by different or same processor 12.

Hereinafter, the method described in an embodiment of the present is described with various apparatuses, devices, and modules in the computing apparatus 10. Each of the processes of the present method may be adjusted according to embodiment conditions and is not limited thereto. In some embodiments, some of the processes may be implemented by different processors 12.

Figure 2:
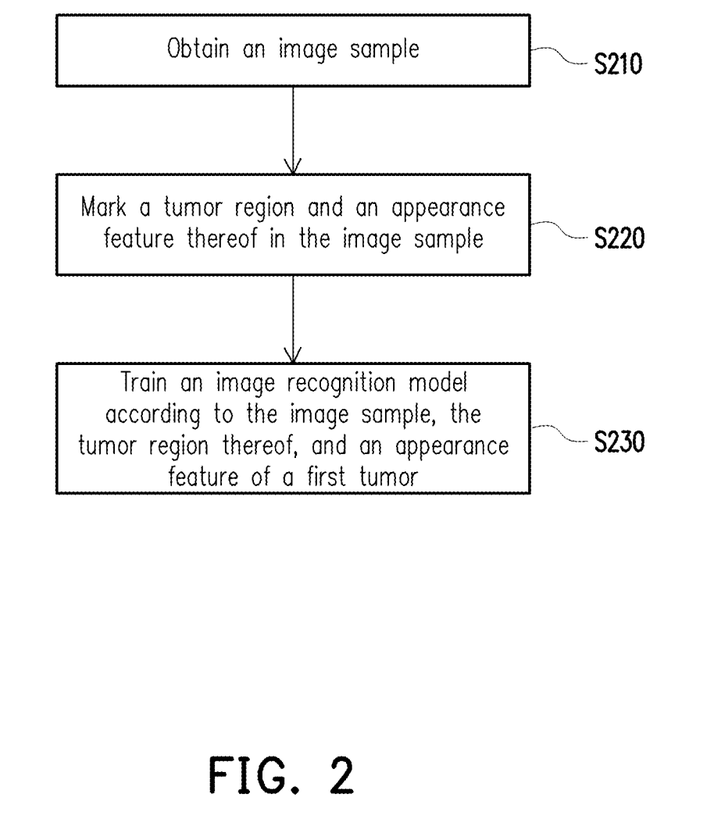
FIG. 2 is a flowchart of a processing method of a medical image according to an embodiment of the invention.

FIG. 2 is a flowchart of a processing method of a medical image according to an embodiment of the invention. Referring to FIG. 2, the processor 12 obtains one or more image samples (step S210). Specifically, each image sample is an image obtained by photographing one or more animal bodies. The animal body is, for example, a human body, a dog body, or the body of other animals. In addition, the image sample may only be for a single or a plurality of parts and/or organs in the animal body. Examples include breasts, lungs, and lower abdomen. According to different application requirements, the image samples may be ultrasound images, tomosynthesis images, Magnetic Resonance Imaging (MRI) images, or other medical images.

In an embodiment, the processor 12 may select one or more of a plurality of initial samples as the image sample. For example, the initial samples are 951 patients and the corresponding 2006 mammography images thereof. The processor 12 selects samples from the initial samples that belong to patients who have undergone lumpectomy surgery and have mammography images within half a year before surgery, and collects pathology reports of these patients, to determine the proportion of excised tumors with extensive intraductal component. The collected samples may include a first sample and a second sample. The first sample is taken at a first angle/perspective relative to the animal body, and the second sample is taken at a second angle/perspective relative to the animal body, via magnification photography, or via compression photography. Examples include different angles of Medial Lateral Oblique (MLO) view, Cranio-Caudal (CC) view, magnification, and compression photography. The first or second angle may be relative to the side, front, oblique, or other angles of the animal body.

In some embodiments, the processor 12 may exclude implants, injected foreign bodies, or other imaging samples containing foreign bodies in the animal body.

It should be noted that the screening conditions of image samples are not limited to the above breast tumor-related photography, and may also be tumors of other parts or types.

The processor 12 marks a tumor region and an appearance feature thereof in the image sample (step S220). Specifically, the tumor region is a region in the image sample corresponding to the tumor and represents the location of the tumor. The contour of the tumor region may be substantially or exactly the same as the contour of the tumor. Alternatively, the tumor region is simply at least one point or an area of any shape in the region where the tumor is located. Still alternatively, the tumor region may completely or partially cover the region where the tumor is located, and is not limited to the shape thereof. Moreover, the appearance feature represents the appearance of the first tumor corresponding to the tumor region.

In an embodiment, the appearance feature includes calcification, mass, local asymmetry, atypical hyperplasia, absence of features, and/or other features. For example, the mass of extensive intraductal component is often related to tumor appearance features such as calcification, local asymmetry, and presence or absence of a mass. Although it is difficult to directly identify these tumor appearance features as the basis for extensive intraductal component clinically, these tumor appearance features are still important determination factors.

In an embodiment, the marking result of the tumor region and/or the appearance feature thereof may be obtained by receiving the user's marking operation on the first tumor in the image sample displayed on a display (not shown) via an input apparatus (not shown, e.g., keyboard, mouse, or touch panel). For example, the physician pre-marks the suspected tumor region in each mammography image on the user interface in a square or irregular shape, and selects the appearance feature of the tumor.

In an embodiment, the processor 12 may recognize the tumor region and/or the appearance feature thereof in the image sample via object detection. For example, the processor 12 implements object detection by applying a neural network-based algorithm (for example, YOLO (You only look once), Region Based Convolutional Neural Networks (R-CNN), or Fast R-CNN (Fast CNN)) or a feature matching-based algorithm (e.g., Histogram of Oriented Gradient (HOG), Harr, or feature alignment of Speeded Up Robust Features (SURF)). It should be noted that the embodiments of the invention do not limit the algorithm used for object detection. In an embodiment, the object detection may also be performed by an external apparatus, and the marking result is provided to the computing apparatus 10.

Figure 3:
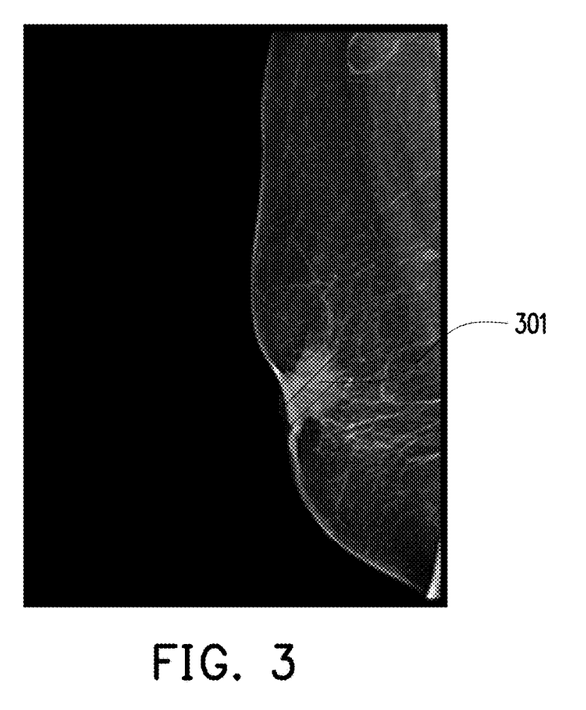
FIG. 3 is a schematic diagram of marking a tumor region according to an embodiment of the invention.

Taking a mammography image as an example, FIG. 3 is a schematic diagram of marking a tumor region 301 according to an embodiment of the invention. Referring to FIG. 3, the diagonal line region is the tumor region 301. The tumor region 301 substantially covers the tumor.

In an embodiment, the processor 12 may segment the tumor region from the image sample. For example, images outside the tumor region are deleted and only images in the tumor region are kept. As another example, a cropping rectangle is formed according to the maximum length and the maximum width of the tumor region, and the image sample is segmented by the cropping rectangle, so that the cropping rectangle may cover the tumor region. The processor 12 may adjust the image of the tumor region to a uniform size, such as 1024×768 pixels. The processor 12 may also adjust the images of the tumor regions in other image samples to this uniform size, so that the data distribution used for subsequent model training and inference is more uniform.

Figure 4:
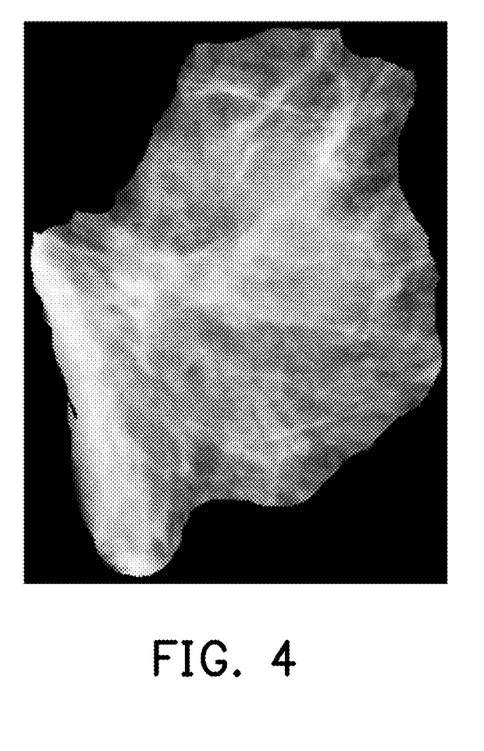
FIG. 4 is a schematic diagram of image segmentation according to an embodiment of the invention.
Figure 5A:
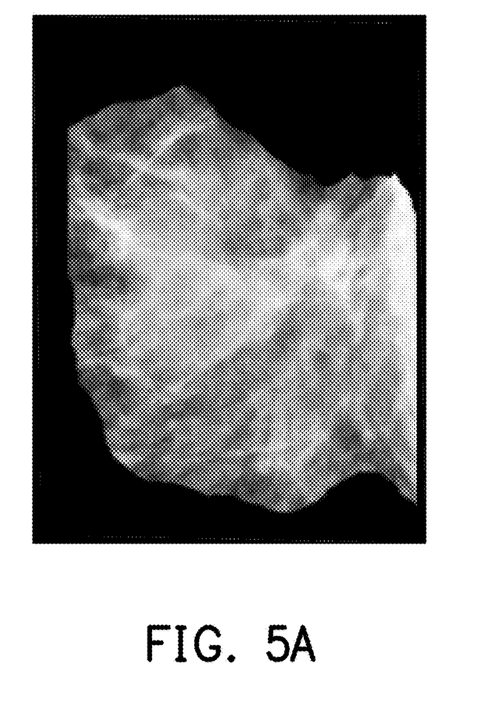
FIG. 5A to FIG. 5D are schematic diagrams of image enhancement according to an embodiment of the invention.
Figure 5B:
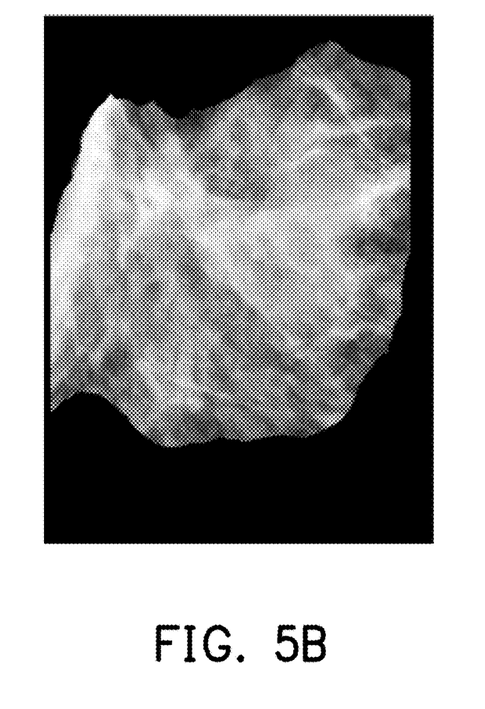
Figure 5C:
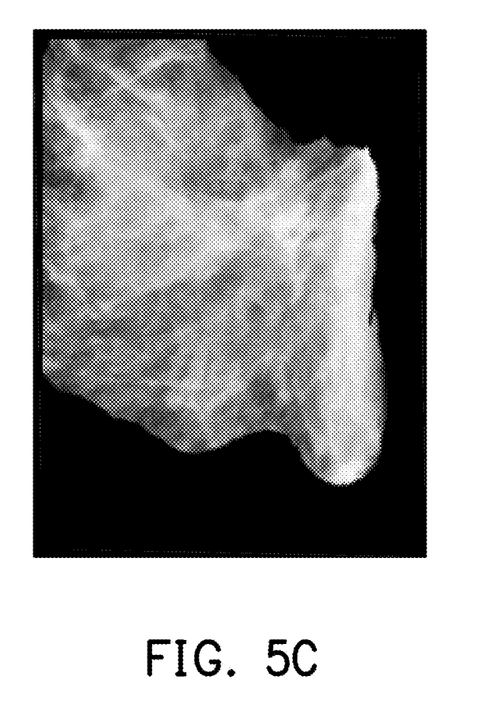
Figure 5D:
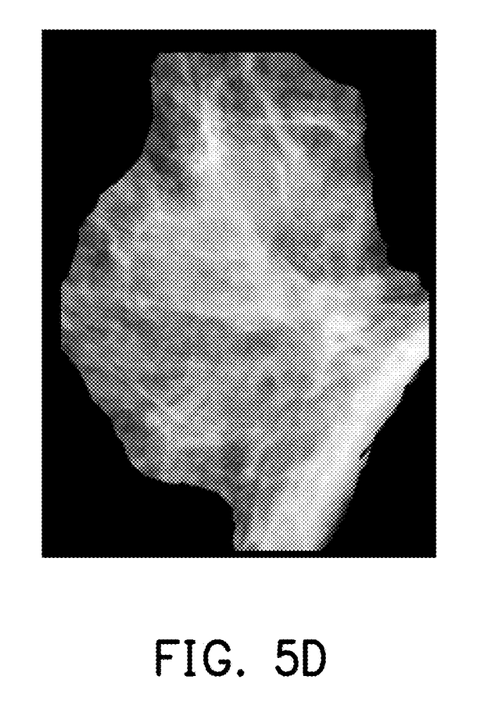

For example, FIG. 4 is a schematic diagram of image segmentation according to an embodiment of the invention. Referring to FIG. 4, it is assumed that this is an image obtained by segmenting the tumor region 301 of FIG. 3.

In other embodiments, the processor 12 may also not segment the image sample or directly segment the image sample according to a specific shape.

In an embodiment, the processor 12 may increase the diversity of the sample via image enhancement (data augmentation). The image sample includes a third sample and a fourth sample. The processor 12 may rotate, flip, and/or translate the third sample to generate one or more fourth samples.

For example, FIG. 5A to FIG. 5D are schematic diagrams of image enhancement according to an embodiment of the invention. Please refer to FIG. 5A to FIG. 5D, which are image samples generated by the processor 12 randomly flipping vertically, randomly flipping horizontally, randomly translating up and down by 10% distance, or randomly rotating by 45 degrees, the image sample of FIG. 4, respectively.

It should be noted that, the processor 12 may also amplify the image sample via image processing such as adjusting the brightness, contrast, or scale, and the type of image processing is not limited.

Referring to FIG. 2, the processor 12 trains an image recognition model according to the image sample, the tumor region thereof, and an appearance feature of a first tumor (step S230). Specifically, the image recognition model is trained based on a machine learning algorithm (for example, Deep Neural Network (DNN), Multi-Layer Perceptron (MLP), Support Vector Machine (SVM), EfficientNetB0, or other machine learning models). In an embodiment, the image recognition model may be used for image inference. The machine learning algorithm may analyze training samples to obtain patterns therefrom, so as to predict unknown data via the patterns. The image recognition model is a machine learning model constructed after learning, and inferences are made based on the evaluation data.

The image recognition model identifies a second tumor in an image to be evaluated is a first type. The first type is related to the tumor region (represents the location of the first tumor) and the appearance feature of the first tumor. Type 1 tumor is different from other tumors by the location and appearance feature thereof. For example, the first type is related to invasive breast carcinoma with extensive intraductal component, or the first type of tumor is a tumor of extensive intraductal component. As another example, the first type of tumor is a liver tumor. However, the first type is not limited to the above scope, and the user may make changes as needed. Therefore, during the training process, by further assigning the actual results of the training, testing, and/or verification samples are the first type, the image recognition model may be enabled to establish the correlation between the input sample and the first type. The image to be evaluated is input into the trained image recognition model to predict the second tumor in the image to be evaluated is the first type of tumor. In an embodiment, the prediction result of the image recognition model for the first type may be a probability. In another embodiment, the prediction result of the image recognition model for the first type may be one of "yes" and "no". For example, the predicted probability exceeds a threshold (e.g., 85%, 90%, or 95%). In other embodiments, the image recognition model may also be trained to recognize a second type or other types of tumors.

In an embodiment, the image recognition module further recognizes the appearance feature of the second tumor in the image to be evaluated. The image sample is marked with the actual appearance features thereof. Therefore, the image recognition model establishes the correlation between the input sample and the appearance feature thereof. The image to be evaluated is input into the trained image recognition model to predict the appearance feature of the second tumor in the image to be evaluated. In an embodiment, the prediction result of the image recognition model for appearance type may be a probability of one or more particular appearance types. In another embodiment, the prediction result of the image recognition model for the first type may be "yes" or "no" for one or more specific appearance types.

In an embodiment, the processor 12 assigns recognizing the second tumor is the first type as the first task, assigns recognizing the appearance feature of the second tumor as the second task, and performs multi-task learning on the image recognition model according to the first task and the second task. That is, the first and second tasks may be handled via a single image recognition model. The sharing mechanism of multi-task learning allows a plurality of tasks to share parameters to improve the efficiency and accuracy of multi-task prediction. For example, the first type and the appearance feature respectively establish their own fully connected layers, so that the image recognition model may interactively learn how to recognize images. In this way, in addition to learning the first type of recognition, the image recognition model may also learn to determine the appearance feature of the tumor. In addition, this model design method may avoid the need for the user to manually mark the appearance feature of the tumor in a subsequent model inference, thereby reducing burden of use.

For data set classification, in an embodiment, the image sample includes a fifth sample and a sixth sample. The fifth sample and the sixth sample are both directed to the same animal body. The processor 12 may use the fifth sample and the sixth sample simultaneously as one of a training sample, a verification sample, and a test sample of the image recognition model. For example, the processor 12 classifies the patients to which the image samples belong into training, verification, and test set patients according to the ratio of 65:10:25 (i.e., classifying the image samples into training samples, verification samples, and test samples), and classifies the image samples of the same set of patients together to respectively train, verify, and test the accuracy of the model. For example, the image sample of user A is only used as a training sample, and the image sample of user B is only used as a test sample. This classification mechanism may prevent the same patient image from appearing in different sets at the same time and affecting the reliability of model verification when verifying and testing the model. Moreover, since each set may include MLO view, CC view, magnification, and compression photography at different image angles simultaneously, the image recognition model also has the ability to predict images from different shooting angles or different shooting methods at the same time. In the inference stage, the image recognition model may simultaneously refer to images of a single patient from multiple angles and/or multiple shooting methods, and then perform integrated prediction to optimize the prediction accuracy of the model.

For the setting of the training parameters, in an embodiment, the processor 12 may train the image recognition model via a hybrid loss function. This hybrid loss function is:

$$L(x, w_f, w_{T_1}, w_{T_2}) = \alpha_1 \times CE(y_1, T_1(f(x, w_f), w_{T1})) +$$

$$\alpha_2 \times \sum_{j=1}^{6} CE(y_{2j}, T_{2j}(f(x, w_f), w_{T2}))$$

x is the image sample $w_f$, $w_{T_1}$, $w_{T_2}$ are weights the image recognition model needs to learn, $y_1$ is a first true result recognizing the first tumor is the first type, $y_{2j}$ is a second true result recognizing an appearance feature of the first tumor, $\alpha_1$, $\alpha_2$, are hyperparameters of the image recognition model, $f(x, w_f)$ is a feature encoder of the image sample, $T_1(x, w_f)$ and $T_2(x, w_f)$ are classifiers of $y_1$ and $y_{2j}$ respectively, $CE(y,\hat{y})=-[y\times\log(\hat{y})+(1-y)\log(1-\hat{y})]$ is a cross entropy loss, y is a true result, and $\hat{y}$ is a prediction result corresponding to the classifiers.

The optimizer adopts, for example, Adam, and the learning rate is set to be, for example, 0.001. The input of each batch of image samples is 4, but not limited thereto. During the training process, after the image recognition model is trained using the training set data (i.e., the training samples in the image samples), via the verification set data (i.e., the verification samples in the image samples), the lowest epoch in the mixed loss function is selected to generate the image recognition model, and the reliability of the image recognition model is verified with the test set data (i.e., the test samples in the image samples).

Moreover, for model inference, in an embodiment, the processor 12 may receive the user's marking operation on the second tumor in the image to be evaluated displayed on a display (not shown) via an input apparatus (not shown, e.g., keyboard, mouse, or touch panel) to obtain the tumor region. In another embodiment, the processor 12 may detect the tumor region corresponding to the second tumor in the image to be evaluated via an object. For the object detection technique, reference may be made to the above description, which is not repeated herein. It is worth noting that, different from the training stage, the inference stage only needs to mark the tumor region, and does not need to mark the appearance feature of the tumor.

Figure 6A:
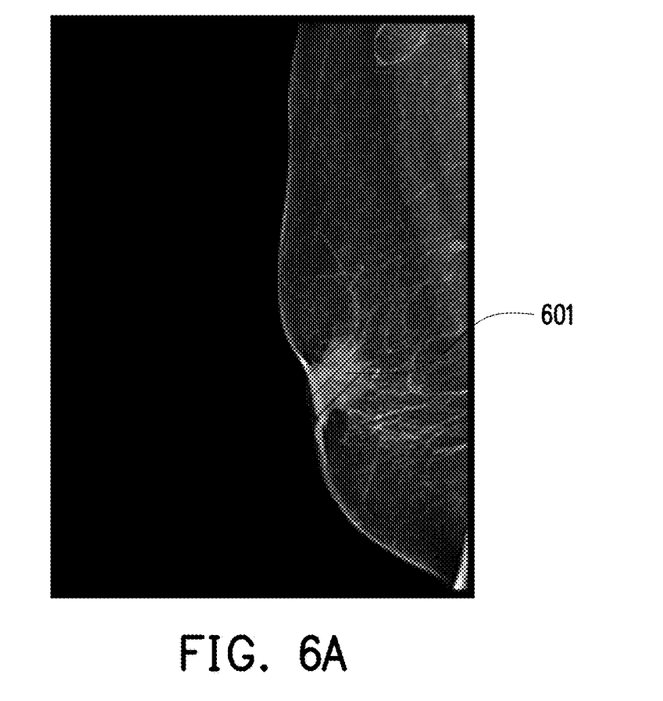
FIG. 6A and FIG. 6B are schematic diagrams of marking a tumor region according to an embodiment of the invention.
Figure 6B:
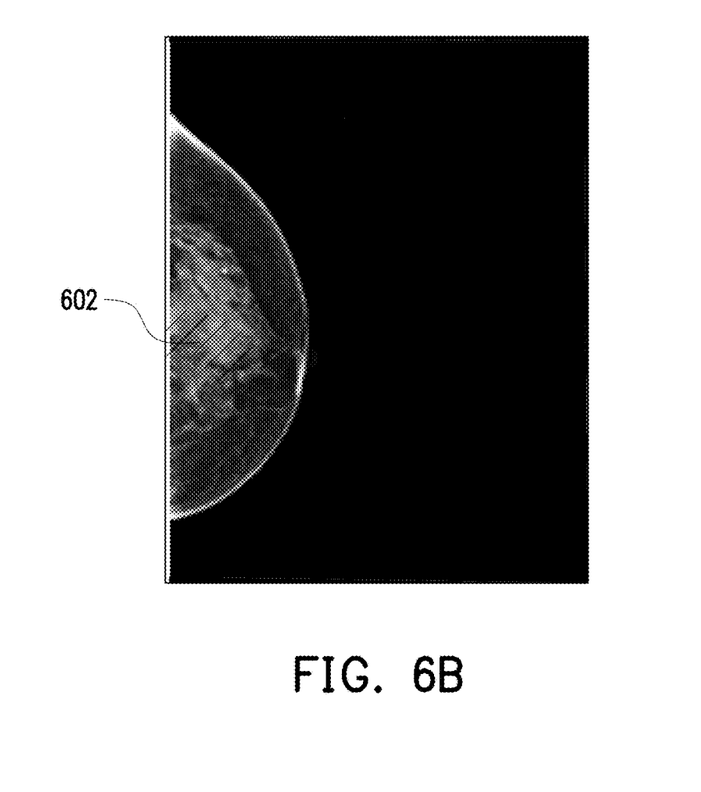

For example, FIG. 6A and FIG. 6B are schematic diagrams of marking a tumor region according to an embodiment of the invention. FIG. 6A is a tumor region 601 (indicated by diagonal lines) in the MLO view. FIG. 6B is a tumor region 602 (indicated by diagonal lines) in the CC view.

In an embodiment, the processor 12 may respectively input the first image to be evaluated and the second image to be evaluated to the trained image recognition model to obtain a first prediction result corresponding to the first image to be evaluated and a second prediction result corresponding to the second image to be evaluated, respectively. The first image to be evaluated is photographed relative to a third angle/direction of a certain animal body, and the second image to be evaluated is photographed relative to a fourth angle/orientation of the same animal body. The first and second prediction results may be the second tumor in the image to be evaluated is the first type and/or the appearance feature of the second tumor. The first or second image to be evaluated input to the image recognition model is marked with the tumor region of the second tumor.

Figure 7:
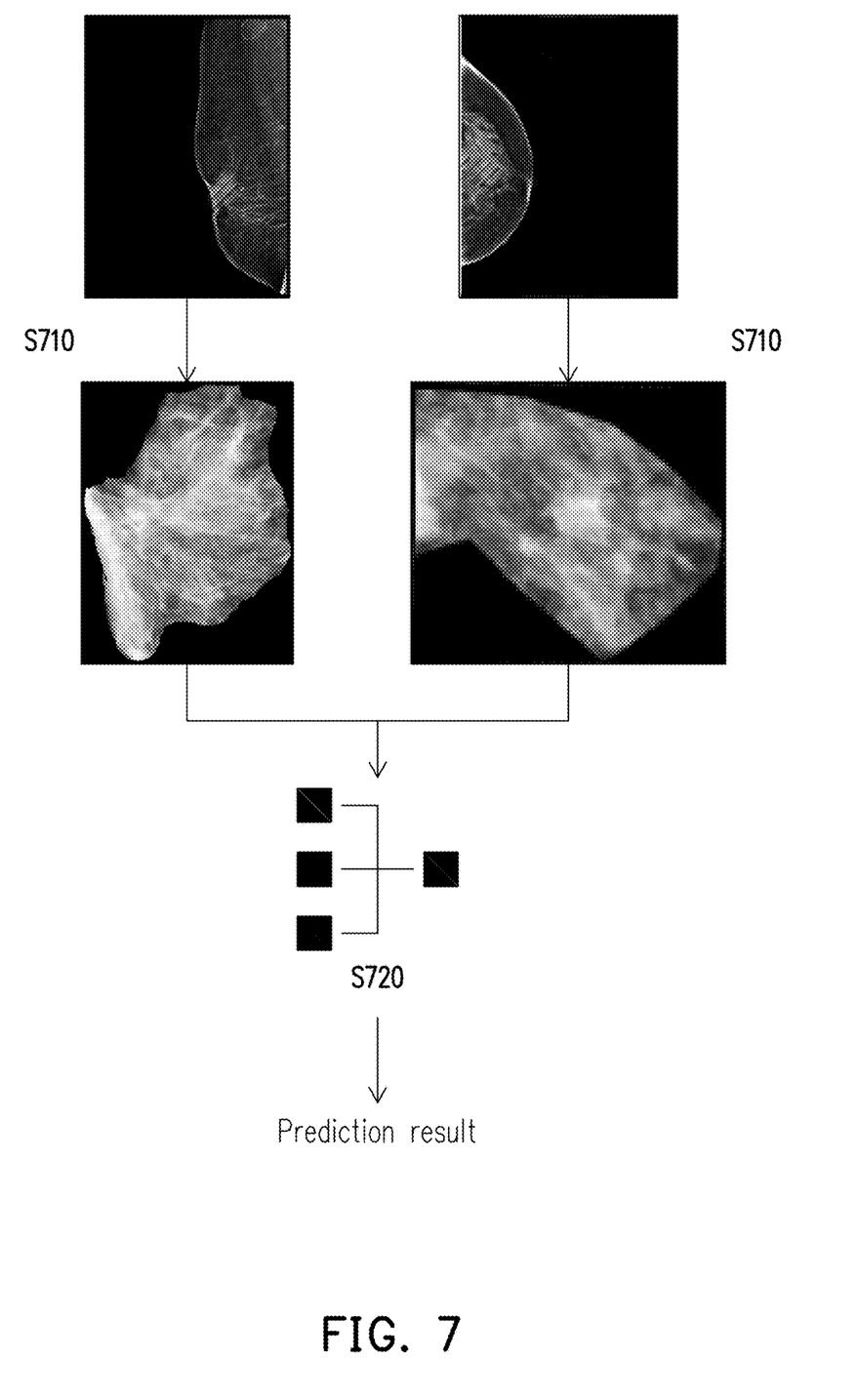
FIG. 7 is a schematic diagram of an inference process according to an embodiment of the invention.

For example, FIG. 7 is a schematic diagram of an inference process according to an embodiment of the invention. Referring to FIG. 7, the processor 12 may perform image preprocessing on, for example, two images to be evaluated obtained by photographing at different angles in FIG. 6A and FIG. 6B (step S710). Examples include tumor region marking, image segmentation, increasing contrast, and/or increasing brightness. The processor 12 may obtain the prediction results of the two images to be evaluated respectively via an image recognition model (step S720).

Since the two images to be evaluated are both for the same animal body, the processor 12 may recognize the second tumor in the first image to be evaluated or the second image to be evaluated is the first type according to the statistical results of the first prediction result and the second prediction result. The statistical result is, for example, an average value of the first prediction result and the second prediction result, a weighted value, or a value calculated by a specific equation. Ultimately, this statistical result may be used as the prediction result of the image recognition model for this single animal body.

In some application scenarios, the image recognition model may assist physicians in making surgical plans. For example, information on the risk level of the patient's breast cancer tumor belonging to extensive intraductal component is provided to provide physicians with a reference for preoperative examination and surgical planning. Thereby, the chance of reoperation and recurrence rate may be reduced, and the negative resection margin of breast-conserving surgery may be improved. Using image recognition to assist in preoperative assessment may not only reduce the physical and mental stress of patients, but also reduce medical expenses.

Based on the above, in the processing method of the medical image and the computing apparatus for processing the medical image according to the embodiments of the invention, the image recognition model simultaneously learns the correlation between the tumor in the image sample and the first type and the appearance feature. By sharing parameters for the task of recognizing the first type and the appearance feature, the accuracy and the efficiency of recognition may be improved. In addition, the embodiments of the invention may also refer to images obtained at different shooting angles or shooting methods, thus helping to improve prediction accuracy.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A processing method of a medical image, comprising:
   obtaining at least one image sample, wherein the at least one image sample is an image obtained by photographing at least one animal body;
   marking a tumor region in the at least one image sample and an appearance feature thereof, wherein the appearance feature represents an appearance of a first tumor corresponding to the tumor region;

training an image recognition model according to the at least one image sample, the tumor region thereof, and the appearance feature of the first tumor, wherein the image recognition model recognizes a second tumor in an image to be evaluated is a first type, and the first type is related to the tumor region and the appearance feature of the first tumor;

respectively inputting a first image to be evaluated and a second image to be evaluated to the trained image recognition model to obtain a first prediction result and a second prediction result, wherein the first image to be evaluated is photographed at a third angle relative to one of the at least one animal body, and the second image to be evaluated is photographed at a fourth angle relative to the same animal body; and recognizing a second tumor in the first image to be evaluated or the second image to be evaluated is the first type according to a statistical result of the first prediction result and the second prediction result.

2. The processing method of the medical image of claim 1, wherein the image recognition model recognizes an appearance feature of the second tumor, and the steps of training the image recognition model comprise:

assigning recognizing the second tumor is the first type as a first task;

assigning recognizing the appearance feature of the second tumor as a second task; and performing a multi-task learning on the image recognition model according to the first task and the second task.

3. The processing method of the medical image of claim 1, wherein the appearance feature comprises at least one of calcification, mass, local asymmetry, atypical hyperplasia, and absence of features.

4. The processing method of the medical image of claim 1, further comprising:

segmenting the tumor region from one of the image samples; and adjusting an image of the tumor region to a uniform size, wherein images of tumor regions in other image samples are all adjusted to the uniform size.

5. The processing method of the medical image of claim 1, wherein the at least one image sample comprises a first sample and a second sample, and the processing method further comprises:

rotating, flipping, or translating the first sample to generate the second sample.

6. The processing method of the medical image of claim 1, wherein the at least one image sample comprises a third sample and a fourth sample, the third sample is photographed at a first angle relative to the at least one animal body, and the fourth sample is photographed at a second angle with respect to the at least one animal body, via magnification photography or via compression photography.

7. The processing method of the medical image of claim 1, wherein the at least one image sample comprises a fifth sample and a sixth sample, the fifth sample and the sixth sample are both for the same animal body, and the processing method further comprises:

using the fifth sample and the sixth sample simultaneously as one of a training sample, a verification sample, and a test sample of the image recognition model.

8. The processing method of the medical image of claim 1, wherein the step of training the image recognition model comprises:

training the image recognition model via a mixed loss function, wherein the mixed loss function is:

$$L(x, w_f, w_{T_1}, w_{T_2}) a_1 \times CE(y_2, T_1(f(x, w_f), w_{T1})) + a_2 \times \sum_{j=1}^{6} CE(y_{2j}, T_{2j}(f(x, w_f), w_{T2}))$$

x is the at least one image sample, $w_f$, $w_{T_1}$, $w_{T_2}$ are weights the image recognition model needs to learn, $y_1$ is a first true result recognizing the first tumor is the first type, $y_{2j}$ is a second true result recognizing the appearance feature of the first tumor, $a_1$, $a_2$ are hyperparameters of the image recognition model, $f(x, w_f)$ is a feature encoder of the at least one image sample, $T_1(x, w_f)$ and $T_2(x, w_f)$ are classifiers of $y_1$, $y_2$ respectively, $CE(y, \hat{y}) = -[y \times \log(\hat{y}) + (1-y)\log(1-\hat{y})]$ is a cross entropy loss, y is a true result, and $\hat{y}$ is a prediction result corresponding to the classifiers.

9. The processing method of the medical image of claim 1, wherein the first image to be evaluated input to the image recognition model is marked with a tumor region of the second tumor.

10. A computing apparatus for processing a medical image, comprising:

a memory for storing a code; and a processor coupled to the memory and configured to load and execute the code to:

obtain at least one image sample, wherein the at least one image sample is an image obtained by photographing at least one animal body;

mark a tumor region in the at least one image sample and an appearance feature thereof, wherein the appearance feature represents an appearance of a first tumor corresponding to the tumor region;

train an image recognition model according to the at least one image sample, the tumor region thereof, and the appearance feature of the first tumor, wherein the image recognition model recognizes a second tumor in an image to be evaluated is a first type, and the first type is related to the tumor region and the appearance feature of the first tumor;

input a first image to be evaluated and a second image to be evaluated to the trained image recognition model respectively to obtain a first prediction result and a second prediction result, wherein the first image to be evaluated is photographed at a third angle relative to one of the at least one animal body, and the second image to be evaluated is photographed at a fourth angle relative to the same animal body; and recognize a second tumor in the first image to be evaluated or the second image to be evaluated is the first type according to a statistical result of the first prediction result and the second prediction result.

11. The computing apparatus for processing the medical image of claim 10, wherein the image recognition model further recognizes an appearance feature of the second tumor, and the processor is further configured to:

assign recognizing the second tumor is the first type as a first task;

assign recognizing the appearance feature of the second tumor as a second task; and perform a multi-task learning on the image recognition model according to the first task and the second task.

12. The computing apparatus for processing the medical image of claim 10, wherein the appearance feature comprises at least one of calcification, mass, local asymmetry, atypical hyperplasia, and absence of features, and the first type is related to invasive breast carcinoma with extensive intraductal component.

13. The computing apparatus for processing the medical image of claim 10, wherein the processor is further configured to:
segment the tumor region from one of the image samples; and
adjust an image of the tumor region to a uniform size, wherein images of tumor regions in other image samples are all adjusted to the uniform size.

14. The computing apparatus for processing the medical image of claim 10, wherein the at least one image sample comprises a first sample and a second sample, and the processor is further configured to:
rotate, flip, or translate the first sample to generate the second sample.

15. The computing apparatus for the medical image of claim 10, wherein the at least one image sample comprises a third sample and a fourth sample, the third sample is photographed at a first angle relative to the at least one animal body, and the fourth sample is photographed at a second angle with respect to the at least one animal body, via magnification photography or via compression photography.

16. The computing apparatus for processing the medical image of claim 10, wherein the at least one image sample comprises a fifth sample and a sixth sample, the fifth sample and the sixth sample are both for the same animal body, and the processor is further configured to:
use the fifth sample and the sixth sample simultaneously as one of a training sample, a verification sample, and a test sample of the image recognition model.

17. The computing apparatus for processing the medical image of claim 10, wherein the processor is further configured to:
train the image recognition model via a mixed loss function, wherein the mixed loss function is:

$$L(x,w_f,w_{T_1},w_{T_2})=\alpha_1 \times CE(y_1,T_1(f(x,w_f),w_{T_1}))+\alpha_2 \times \Sigma_{j=1}^{6} CE(y_{2j},T_{2j}(f(x,w_f),w_{T_2})) \quad (1)$$

x is the at least one image sample, $w_f$, $w_{T_1}$, $w_{T_2}$ are weights the image recognition model needs to learn, $y_1$ is a first true result recognizing the first tumor is the first type, $y_{2j}$ is a second true result recognizing the appearance feature of the first tumor, $a_1$, $a_2$ are hyperparameters of the image recognition model, $f(x, w_f)$ is a feature encoder of the at least one image sample, $T_1(x, w_f)$ and $T_2(x, w_f)$ are classifiers of $y_1$, $y_2$ respectively, $CE(y,\hat{y})=-[y \times \log(\hat{y})+(1-y)\log(1-\hat{y})]$ is a cross entropy loss, y is a true result, and $\hat{y}$ is a prediction result corresponding to the classifiers.

18. The computing apparatus for processing the medical image of claim 10, wherein the first image to be evaluated input to the image recognition model is marked with a tumor region of the second tumor.

* * * * *